United States Patent [19]

Sakakiyama

[11] Patent Number: 4,598,806
[45] Date of Patent: Jul. 8, 1986

[54] VEHICULAR ELECTROMAGNETIC CLUTCH CONTROL SYSTEM HAVING A THROTTLE SWITCH FAILURE DETECTING CIRCUIT

[75] Inventor: Ryuzo Sakakiyama, Tokyo, Japan
[73] Assignee: Fuji Jukogyo Kabushiki Kaisha, Tokyo, Japan
[21] Appl. No.: 693,710
[22] Filed: Jan. 23, 1985

[30] Foreign Application Priority Data

Jan. 30, 1984 [JP] Japan .................. 59-14748

[51] Int. Cl.$^4$ .......................................... B60K 41/02
[52] U.S. Cl. .............................. 192/0.075; 192/0.096; 192/3.56
[58] Field of Search .................. 192/0.052, 0.07, 0.075, 192/0.076, 0.092, 0.096, 3.54, 3.55, 3.56, 3.58, 3.61, 3.62, 21.5, 103 R

[56] References Cited

U.S. PATENT DOCUMENTS

| | | | |
|---|---|---|---|
| 3,215,234 | 11/1965 | Hirano | 192/3.56 X |
| 3,402,793 | 9/1968 | Scholl | 192/3.56 X |
| 4,343,387 | 8/1982 | Hofbauer | 192/0.076 |
| 4,413,714 | 11/1983 | Windsor | 192/3.58 X |
| 4,449,617 | 5/1984 | Sakakiyama et al. | 192/0.076 X |
| 4,457,411 | 7/1984 | Hiramatsu | 192/0.076 |
| 4,473,143 | 9/1984 | Windsor | 192/0.052 |

FOREIGN PATENT DOCUMENTS 2071803 9/1981 United Kingdom .

Primary Examiner—Lawrence J. Staab
Assistant Examiner—Dwight G. Diehl
Attorney, Agent, or Firm—Martin A. Farber

[57] ABSTRACT

A system for controlling an electromagnetic clutch for a vehicle, the system has a pulse generating circuit responsive to ignition pulses for an engine for producing pulses, an accelerator switch for sensing the depression of an accelerator pedal of the engine and for producing a first signal.

An accelerator position switch is provided for sensing a deep depression of the accelerator pedal and for producing a second signal, and an accelerator pedal switch failure detecting circuit is provided to respond to the inverted signal of the first signal and to the second signal for producing a third signal which is applied to a gate circuit for opening it to pass the pulses thereby enabling the start of the vehicle, even if the accelerator switch is out of order.

5 Claims, 3 Drawing Figures

VEHICULAR ELECTROMAGNETIC CLUTCH CONTROL SYSTEM HAVING A THROTTLE SWITCH FAILURE DETECTING CIRCUIT

BACKGROUND OF THE INVENTION

The present invention relates to a system for controlling the clutch current of an electromagnetic clutch disposed between an engine and the transmission of a motor vehicle.

A clutch torque control system for the drive of a vehicle is, for example, disclosed in British Patent GB No. 2071803B. In the system, the clutch current flowing in a coil of the clutch is controlled in accordance with various signals responsive to operations by a driver, to engine speed, and to vehicle speed. The clutch current increases with respect to the increase of the engine speed for starting the vehicle. When vehicle speed reaches a predetermined speed (for example 20 km/h), a rated current flows through the coil, so that the clutch is entirely engaged.

In such a clutch current control system, the control operation at the start of the vehicle is initiated upon conditions that the vehicle is at a stop and an accelerator pedal is depressed. For the detection of the accelerator pedal, an accelerator pedal switch is provided. If the accelerator pedal switch fails to detect the depression of the accelerator pedal or breaks down, the vehicle can not be started.

SUMMARY OF THE INVENTION

The object of the present invention is to provide a system for controlling an electromagnetic clutch for a vehicle which operates to engage the clutch so as to start the vehicle, even if an accelerator pedal switch is out of order or fails to detect the depression of an accelerator pedal.

According to the present invention, there is provided a system for controlling an electromagnetic clutch for a vehicle having an engine, an accelerator pedal, comprising, a pulse generating circuit responsive to ignition pulses for the engine for producing pulses; a clutch current control element responsive to the pulses for allowing the clutch current to flow in a coil in the electromagnetic clutch; an accelerator switch for sensing the depression of the accelerator pedal and for producing a first signal; sensing means for sensing a deep depression of the accelerator pedal larger than a predetermined degree and for producing a second signal; a gate circuit responsive to the first signal for passing the pulses; an accelerator pedal switch failure detecting circuit responsive to the inverted signal of the first signal and to the second signal for producing a third signal which is applied to the gate circuit for opening it to pass the pulses.

In accordance with another aspect of the present invention, sensing means is an accelerator pedal position switch operatively connected to the accelerator pedal, the clutch current control element is a transistor applied with the pulses at the base thereof, and the gate circuit comprises an OR gate responsive to the first signal and to the third signal for producing a fourth signal, and an AND gate responsive to the pulses and to the fourth signal. The accelerator pedal switch failure detecting circuit comprises an inverter for inverting the first signal, a trigger pulse generator responsive to the second signal and to the inverted signal, and a flip-flop responsive to the trigger pulse for producing the third signal.

The other objects and features of this invention will be apparently understood from the following description with reference to the accompanying drawings.

DETAILED DESCRIPTION OF THE PREFERRED EMBODIMENT

Figure 1A:
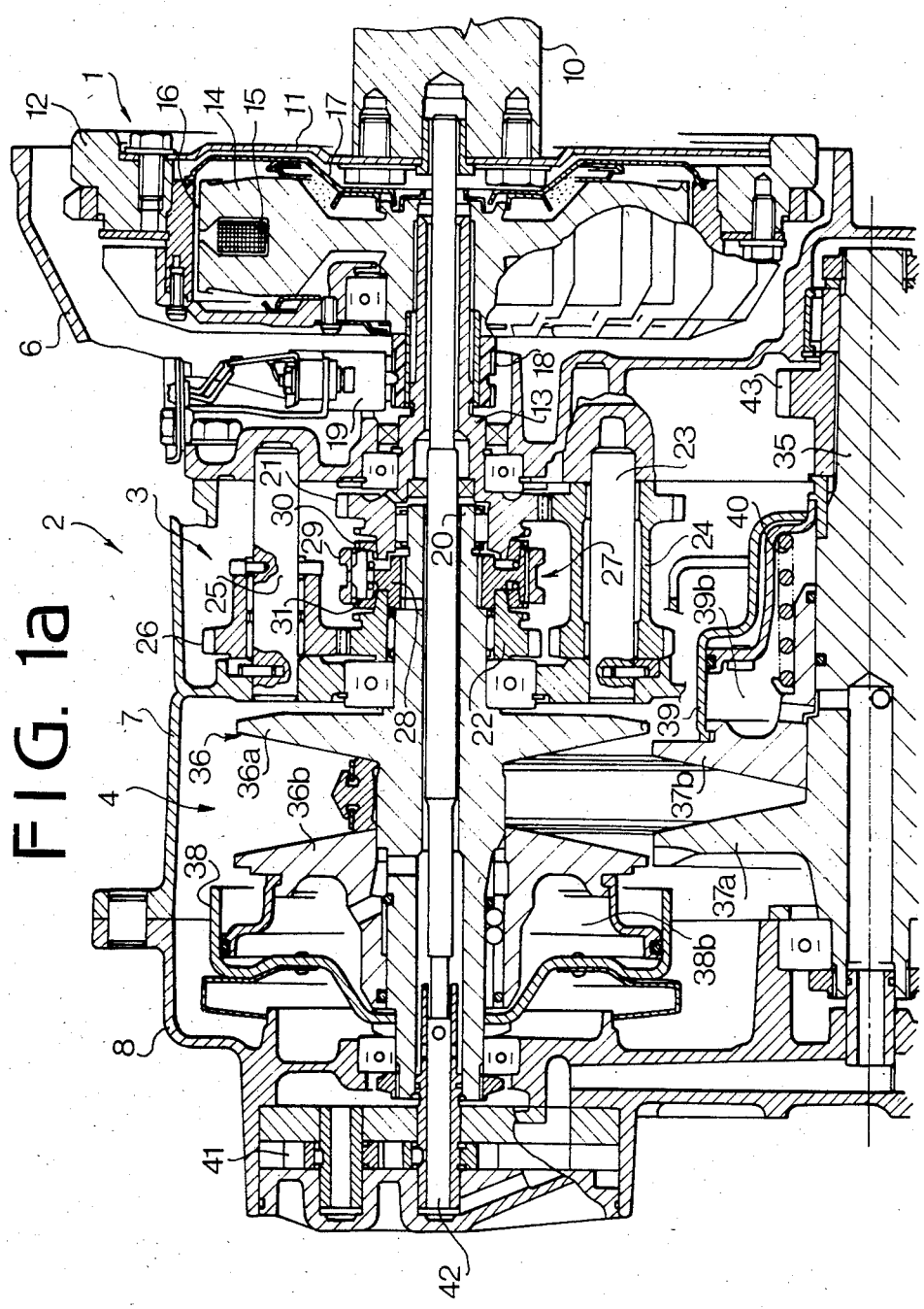
FIGS. 1a and 1b are sectional views of an infinitely variable belt-drive transmission used in a system according to the present invention.
Figure 1B:
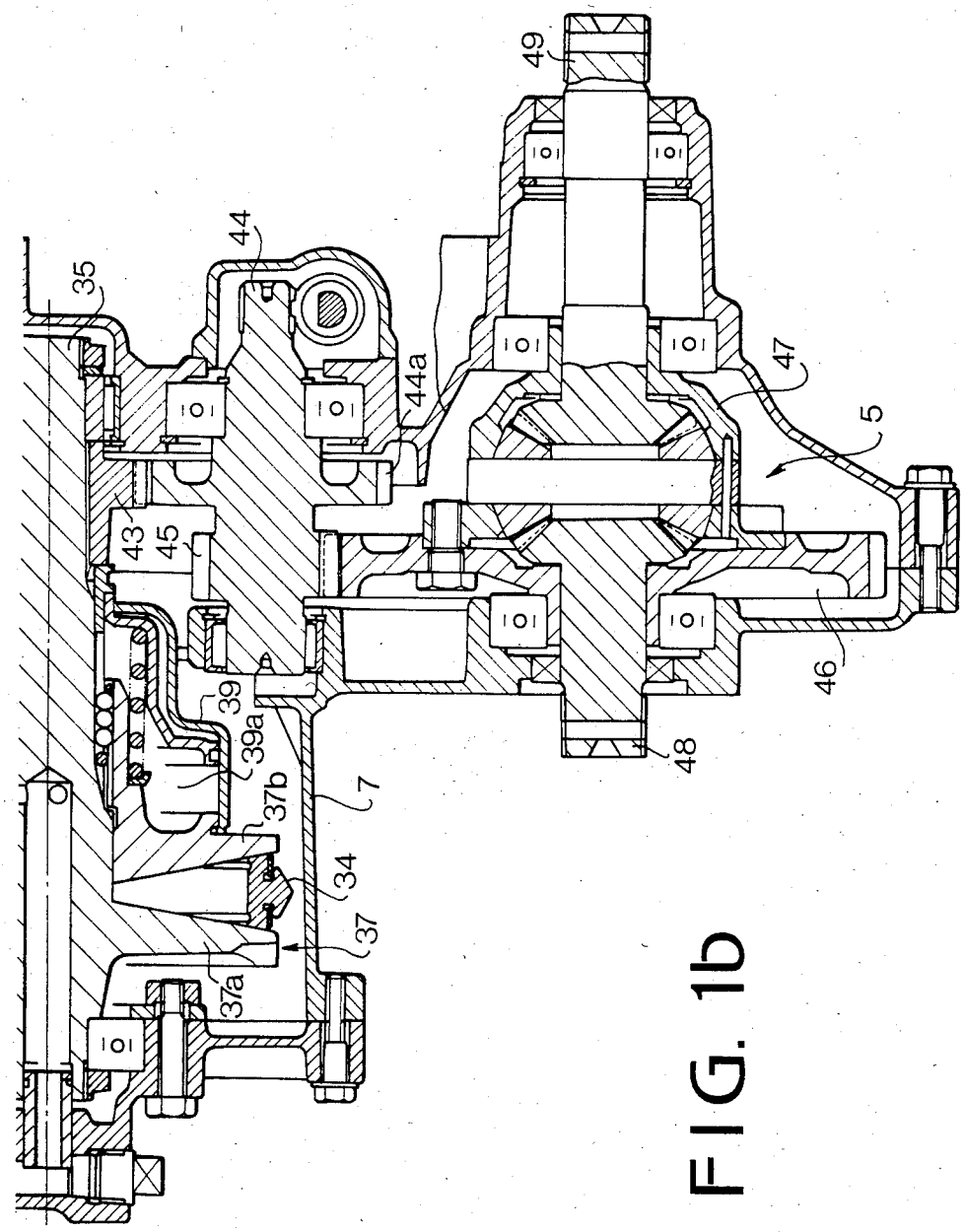

Referring to FIGS. 1a and 1b, an infinitely variable belt-drive automatic transmission for a vehicle, to which the present invention is applied, comprises an electromagnetic powder clutch 1, an infinitely variable belt-drive transmission 2, a selector device 3, pulleys and belt device 4, final reduction device 5, and a pressure oil control circuit (not shown). The electromagnetic powder clutch 1 is provided in a housing 6, and the selector device 3, pulleys, and belt device 4 and final reduction device 5 are provided in a main housing 7 and a side housing 8. A crankshaft 10 of an engine (not shown) is connected to an annular drive member 12 through a drive plate 11 of the electromagnetic powder clutch 1. The electromagnetic powder clutch comprises a driven member 14, a magnetizing coil 15 provided in the driven member 14. The driven member 14 has its outer periphery spaced from the inner periphery of the drive member 12 by a gap 16, and a powder chamber 17 is defined between the drive member 12 and driven member 14. The powder chamber 17 is filled with powder of magnetic material. The driven member 14 is secured to an input shaft 13 of the belt-drive transmission. A holder secured to the driven member 14 carries slip rings 18 which are electrically connected to the coil 15. The coil 15 is supplied through brushes 19 and slip rings 18 with current from a control circuit for the electromagnetic powder clutch.

When the magnetizing coil 15 is excited by the clutch current, driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the belt-drive transmission 2, the selector device 3 is provided between the input shaft 13 and a main shaft 20. The main shaft 20 is cylindrical and is disposed coaxially with the input shaft 13. The selector device 3 comprises a drive gear 21 integral with input shaft 13, reverse driven gear 22 rotatably mounted on the main shaft 20, and a synchronizer 27 mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of driven gear 22 through rings 30 or 31.

At a neutral position (N range) of a selector lever (not shown), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a driving position (D range).

When the sleeve 29 is engaged with the gear 22, the input shaft 13 is connected to the main shaft 20 through gears 21, 24, 26 and 22 to provide a reverse driving position (R range).

The main shaft 20 has an axial passage in which an oil pump driving shaft 42 connected to crankshaft 10 is mounted. An output shaft 35 is provided in parallel with the main shaft 20. A drive pulley 36 and a driven pulley 37 are mounted on shafts 20 and 35. A fixed conical disc 36a of the drive pulley 36 is integral with main shaft 20 and an axially movable conical disc 36b is axially slidably mounted on the main shaft 20. The movable conical disc 36b also slides in a cylinder secured to the main shaft 20 to form a servo device 38. A chamber of the servo device 38 communicates with an oil pump 41 through the pressure oil control circuit. The oil pump 41 is driven by the shaft 42.

A fixed conical disc 37a of the driven pulley 37 is formed on the output shaft 35 opposite the movable disc 36b and a movable conical disc 37b is slidably mounted on the shaft 35 opposite disc 36a. Movable conical disc 37b has a cylindrical portion in which a piston portion of the output shaft 35 is slidably engaged to form a servo device 39. A chamber of the servo device 39 is communicated with the oil pump 41 through the pressure oil control circuit. A spring 40 is provided to urge the movable conical disc 37b to the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of the vehicle driving wheels through a differential 47.

The pressure oil control circuit is responsive to vehicle speed, engine speed and throttle valve position for controlling the oil from the oil pump 41 to servo devices 38 and 39 thereby to move discs 36b and 37b. Thus, transmission ratio is infinitely changed.

Figure 2:
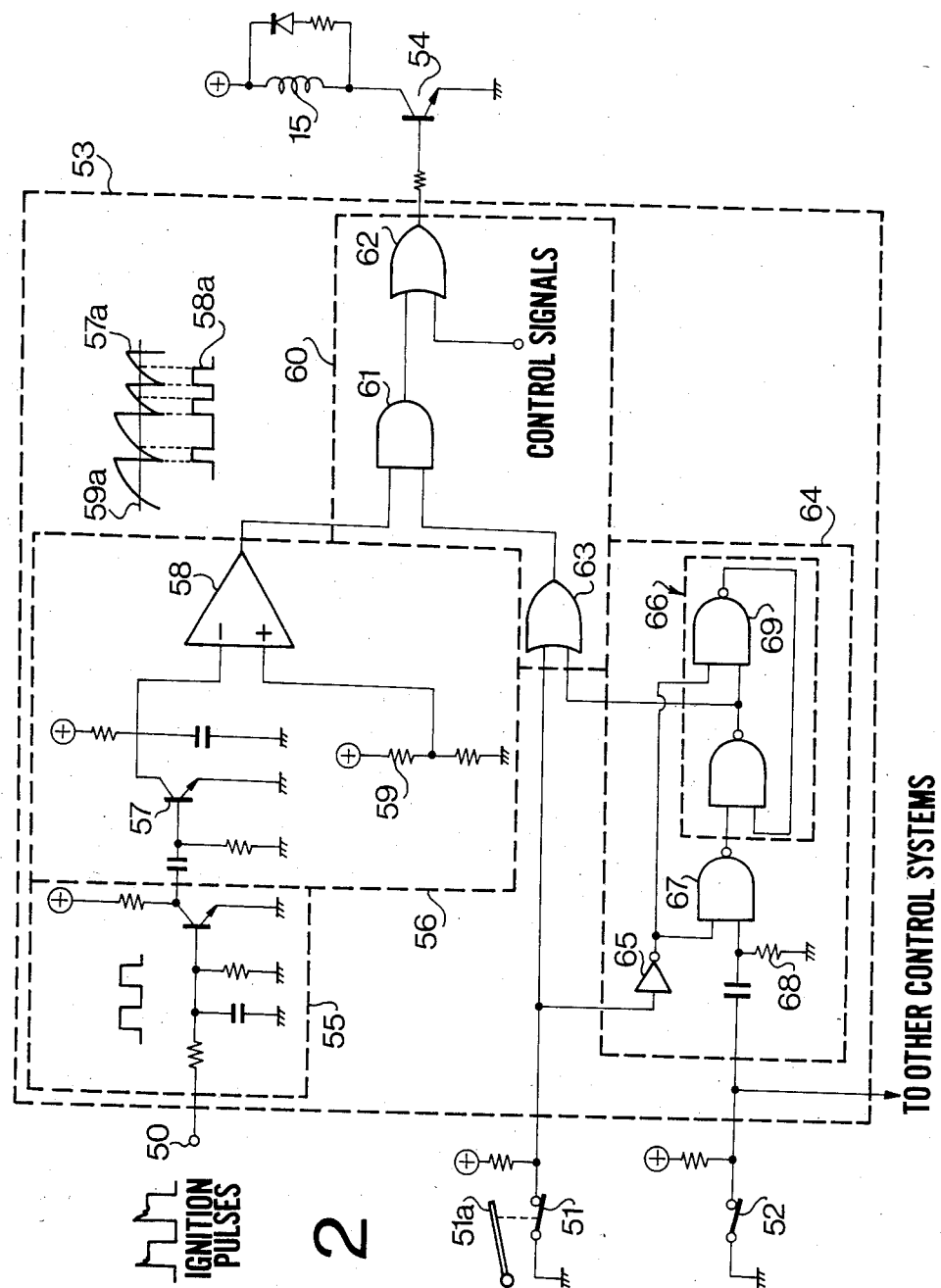
FIG. 2 is a schematic diagram showing a control system according to the present invention.

Referring to FIG. 2 showing a control system according to the present invention, the control system is provided with an ignition pulse input terminal 50 applied with ignition pulses of the engine, an accelerator switch 51 for detecting the depression of an accelerator pedal 51a of the vehicle, and an accelerator pedal position switch 52 operatively connected to the accelerator pedal. Signals dependent on the ignition pulses and switches 51 and 52 are applied to a control unit 53 to control the clutch current passing through the coil 15 and a transistor 54, as described hereinafter in detail.

The accelerator switch 51 is normally closed, and opened to produce a high level signal, when the accelerator pedal 51a is depressed. The accelerator pedal position switch 52 is also normally closed, and opened when the accelerator pedal is depressed over a predetermined position, producing a high level signal.

Ignition pulses at the input terminal 50 are applied to a rectangular pulse generating circuit 56 through a waveform shaping circuit 55. The rectangular pulse generating circuit 56 comprises a sawtooth generator 57, a reference voltage generator 59, and a comparator for comparing the sawtooth waveform signal 57a from the generator 57 with the reference voltage 59a from the generator 59, producing rectangular pulses 58a. The pulse separation of the pulses 58a decreases with the increase of engine speed. The pulses 58a are applied to the base of the transistor 54 through an AND gate 61 and OR gate 62 in an operating condition deciding circuit 60.

The output signal of accelerator switch 51 is applied to the AND gate 61 through an OR gate 63 and to an inverter 65 of an accelerator switch failure detecting circuit 64. The detecting circuit 64 comprises an R-S flip-flop 66 comprising a pair of NAND gates, NAND gate 67 for the input of the flip-flop, and a differentiation circuit 68 connected between the accelerator pedal position switch 52 and the NAND gate 67. The output of the inverter 65 is connected to the other input of NAND gate 67 and to an input of a NAND gate 69 for resetting the flip-flop 64. The output of the flip-flop 64 is connected to the other input of the OR gate 63.

The output of the switch 52 is also applied to other control systems for controlling the clutch current in dependence on transition of the driving conditions and others. Further, the OR gate 62 is applied with other control signals, such as drag current, inverted current, and others.

In operation, at the start of the vehicle, when the accelerator switch 51 is normally operated by the depression of the accelerator pedal 51, a high level output is applied to the AND gate 61 through OR gate 63. Accordingly, pulses 58a are applied to the base of the transistor 54 through AND gate 61 and OR gate 62, so that the transistor 54 is turned on and off. Thus, the clutch current which increases with the increase of the engine speed flows in the coil 15 to smoothly start the vehicle. On the other hand, the high level output of the accelerator switch 51 is inverted to a low level signal by the inverter 65, which is fed to the reset input of the flip-flop 66, causing the output thereof to go to a low level.

If the accelerator switch 51 is out of order at the start of the vehicle, the output thereof is at a low level, which is applied to AND gate 61 through OR gate. Accordingly, the pulses 58a are not applied to the transistor 54 which means disabling of the start of the vehicle. When the accelerator pedal is further depressed to open the switch 52, the output of the switch becomes high level, which is applied to the NAND gate 67 in the form of a pulse through the differentiation circuit 68. Since the NAND gate 67 is applied with a high level signal from the inverter 65, it produces a trigger pulse, setting the flip-flop 66. Thus, the output of the flip-flop changes to a high level, which is applied to the AND gate 61 through OR gate 63. Thus, pulses 58a are applied to the transistor 54 to allow the clutch current to flow, enabling the start of the vehicle. Under such a condition, if the accelerator switch 51 recovers from the failure, the output of the switch becomes a high level, resetting the flip-flop 66 and returning the system to the normal condition.

It will be understood that the system of the present invention can be composed by a microcomputer system.

While the presently referred embodiment of the present invention has been shown and described, it is to be understood that this disclosure is for the purpose of illustration and that various changes and modifications may be made without departing from the spirit and scope of the invention as set forth in the appended claim.

What is claimed is:

1. A system for controlling an electromagnetic clutch for a vehicle having an engine, an accelerator pedal, comprising:
   a pulse generating circuit responsive to ignition pulses for the engine for producing pulses;
   a clutch current control element responsive to the pulses for allowing the clutch current to flow in a coil in the electromagnetic clutch;
   an accelerator switch for sensing the depression of the accelerator pedal and for producing a first signal;
   sensing means for sensing a deep depression of the accelerator pedal larger than a predetermined degree and for producing a second signal;
   a gate circuit responsive to the first signal for passing the pulses;
   an accelerator pedal switch failure detecting circuit responsive to an inverted signal of the first signal and to the second signal for producing a third signal which is applied to the gate circuit for opening it to pass the pulses.

2. The system according to claim 1 wherein the sensing means is an accelerator pedal position switch operatively connected to the accelerator pedal.

3. The system according to claim 1 wherein the clutch current control element is a transistor applied with the pulses at the base thereof.

4. The system according to claim 1 wherein the gate circuit comprises an OR gate responsive to the first signal and to the third signal for producing a fourth signal, and an AND gate responsive to the pulses and to the fourth signal.

5. The system according to claim 1 wherein the accelerator pedal switch failure detecting circuit comprises an inverter for inverting the first signal, a trigger pulse generator responsive to the second signal and to the inverted signal, and a flip-flop responsive to the trigger pulse for producing the third signal.

* * * * *